US007115298B2

(12) United States Patent
Keithly et al.

(10) Patent No.: US 7,115,298 B2
(45) Date of Patent: Oct. 3, 2006

(54) DRIED CITRUS PEEL SUPPLEMENT FOR USE IN COMMERCIAL POULTRY FEED

(75) Inventors: James H. Keithly, Bradenton, FL (US); Thomas Taggart, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 345 days.

(21) Appl. No.: 10/017,126

(22) Filed: Dec. 14, 2001

(65) Prior Publication Data
US 2003/0113401 A1 Jun. 19, 2003

(51) Int. Cl.
*A23K 1/00* (2006.01)

(52) U.S. Cl. .......................... 426/635; 426/2; 426/616; 426/805

(58) Field of Classification Search ..................... 426/2, 426/616, 623, 807, 805, 635
See application file for complete search history.

(56) References Cited

U.S. PATENT DOCUMENTS

| | | | |
|---|---|---|---|
| 2,186,907 A | 1/1940 | Overton et al. | 99/2 |
| 3,647,476 A | 3/1972 | Swisher | 99/105 |
| 3,878,304 A | 4/1975 | Moore | 426/69 |
| 3,966,984 A | 6/1976 | Cocke et al. | 426/472 |
| 4,082,677 A | 4/1978 | Zollar et al. | 252/8.5 B |
| 4,301,719 A | 11/1981 | Gerow | 99/510 |
| 4,331,692 A | 5/1982 | Drevici et al. | 426/610 |
| 4,357,358 A | 11/1982 | Schanze | 426/62 |
| 4,536,494 A | 8/1985 | Carter | 514/31 |
| 4,560,561 A * | 12/1985 | Henderson et al. | 426/74 |
| 4,789,551 A | 12/1988 | Sayle | 426/54 |
| 5,082,675 A | 1/1992 | Jackson et al. | 426/54 |
| 5,304,374 A | 4/1994 | Graves et al. | 424/195.1 |
| 5,425,944 A | 6/1995 | Harich | 424/195.1 |
| 5,631,001 A | 5/1997 | Harich et al. | 424/58 |
| 5,928,403 A * | 7/1999 | Moore, Jr. | 71/21 |
| 5,972,343 A | 10/1999 | Therrien | 424/195.1 |
| 5,976,580 A | 11/1999 | Ivey et al. | 426/2 |
| 6,033,694 A | 3/2000 | Boley | 426/74 |
| 6,126,986 A | 10/2000 | Harris et al. | 426/658 |

FOREIGN PATENT DOCUMENTS

WO    WO 96/31239    10/1996

OTHER PUBLICATIONS

"Feed Information and Animal Production. Proceedings of the Second Symposium of the International Network of Feed Information Centres" 1983, Commonwealth Agricultural Bureaux, Slough, UK XP001149813 p. 425, S.L. Kang and J.H. Choi: "feeding value of dried citrus peel in broiler diets".

A.R.Y. El Boushy & A.F.B. Van der Poel: "Poultry Feed From Waste: Processing and Use" 1994, Chapman & Hall Ltd, London, UK XP002236225, Chapter 6: Fruit, vegetable and brewers' waste, p. 218, last paragraph-p. 224, paragraph 3.

A.R. Eldred et al.: "Evaluation of waste activated sludge (citrus) as a poultry feed ingredient. 1. Performance of chicks, broilers and laying hens" Nutrition Reports International., vol. 14, No. 2, 1976, pp. 139-145, XP008015422, XX, XX the whole document.

P. Florou-Paneri et al.: "Effect of feeding dried citrus pulp on quail laying performance and some egg quality characteristics" Archiv Fuer Gefluegelkunde, vol. 65, No. 4, 2001, pp. 178-181, XP008015425, Verlag Eugen Ulmer GMBH, DE, ISSN: 0003-9098, p. 179; table 2.

Database WPI, Section CH, Week 199805, Derwent Publications Ltd., London, GB; Class B04, AN 1998-042617, XP002235942 & CN 1 136 402 A (Anyang City Animal Quarantine Station), Nov. 27, 1996 abstract.

Deyoe, et al., "Citrus Bioflavonoids in Broiler Diets", *Poultry Science*, 1962.

Fisher, et al., "Avian Atherosclerosis: Retardation by Pectin", Nov. 20, 1964.

Harms, et al., "Citrus Pulp for Poultry Litter and Its Subsequent Feeding Value for Ruminants", Agricultrual Experiment Stations Institute of Food and Agricultural Sciences, Bulletin 724 (Technical), Apr. 1968.

Angalet, et al., "Evaluation of Waste Activated Sludge (Citrus) as a Poultry Feed Ingredient", *Poulry Science*, 1976.

Eldred, et al., "Evaluation of Waste Activated Slude (Citrus) as a Poultry Feed Ingredient", *Nutrition Reports International*, Aug. 1976, vol. 14, No. 2.

Savory and Gentle, "Changes in Food Intake and Gut Size in Japanese Quail in Response to Manipulation of Dietary Fibre Content", Longman: printed in Great Britain. *Br. Pouli. Sci.*, 17: 571-580, 1976.

Coleman and Shaw, "Amino Acid Composition of Dried Citrus Sludge and Its Potential as a Poultry Feedstuff", *J. Agric. Food Chem.*, vol. 25, No. 4, 1977.

Baig and Cerda, "Studies on the Role of Citrus in Health and Disease", *Citrus Nutrition and Quality*, 1980.

Robbins, "Medical and Nutritional Aspects of Citrus Bioflavonoids", *Citrus Nutrition and Quality*, 1980.

Moghazy and Boushy, "Some Neglected Poultry Feedstuffs from Vegetable and Fruit Wastes", *World Poultry Science Journal*, vol. 38, 1982.

Bone, Chapter 17, "Anatomy and Physiology of the Fowl", *Animal Anatomy and Physiology*, Second Ed., 1982.

Shah, et al., "Effect of Dietary Fiber Components on Fecal Nitrogen Excretion and Protein Utilization in Growing Rats", *Journal of Nutrition*, 1982.

(Continued)

*Primary Examiner*—C. Sayala
(74) *Attorney, Agent, or Firm*—Goodwin Procter LLP; Lars Johnson; Carolyn Sloane (57) ABSTRACT

Disclosed is an improved poultry feed diet composition and uses incorporating the feed composition. The feed composition includes byproduct or waste material from citrus juice extraction. The citrus byproduct or waste is at a concentration characteristic of a feed supplement. These feed supplements improve poultry characteristics and enhance feed conversion when compared with traditional poultry feed diets or supplements which rely on components that are not in their respective native states as present in citrus byproduct from juice extraction equipment.

28 Claims, 5 Drawing Sheets

OTHER PUBLICATIONS

Yang and Chung, "Studies on Utilization of Citrus Byproducts as Livestock Feeds", *Korean J. Amin. Sci.* 26(3) pp. 244-250, 1984.

Yang and Chung, "Studies on the Utilization of Citrus Byproducts as Livestock Feeds", *Korean J. Amin. Sci.* 27(4) pp. 239-245, 1985.

Suh, et al., "Utilization of Citrus Pulp and It's Effect on the Cholesterol Metabolism in Chicks", *Korean J. Amin. Sci.* 27(10) pp. 673-678, 1985.

Velloso, et al., "Uso Da Polpa Citrica Na Alimentacao Animal", *Rev. Fac. Med.vet.Zootec.Univ.S.Paulo*, II:21-5, 1985.

Hutton, "Citrus Pulp in Formulated Diets", *Recent Advances in Animal Nutrition in Australia*, 1987.

Siri, et al., "Effects of Dietary Cellulose Level on Growth Performance Development of Internal Organs, Energy and Nitrogen Utilization and Lipid Contents of Growing Chicks", *AJAS*, vol. 5, pp. 369-374, 1992.

Attaway, "Citrus Juice Flavonoids with Anticarcinogenic and Antitumor Properties", Chapter 19, *Food Phytochemicals I: Fruit and Vegetables*, 1994.

Tamasaukas, et al., "Evaluation of the Efficacy of Salstop and Digestor Broilers (Citrade C.A.), Two Products Derived From Citrus Fruit Seed Extracts, Against Avian Coccidiosis: Floor Pen Studies", Parasitol al Dia 20, pp. 118-124, 1996.

Montanari, et al., "Health Promoting Phytochemicals in Citrus Fruit and Juice Products", Chapter 2, *Functionality of Food Phytochemicals*, 1997.

Attaway and Buslig, "Antithrombogenic and Antiatherogenic Effects of Citrus Flavonoids", *Flavonoids in the Living System*, 1998.

Kurowska, et al., "Regulation of Apo B Production in HepG2 Cells by Citrus Limonoids", Chapter 13, *American Chemical Society*, 2000.

Ohara and Yamauchi, "Effects of Dietary Fiber on Growth Performance and Intestinal Development in Chicks", Technical Bulletin of the Faculty of Agriculturel, Kagawa University, 2000.

Florou-Paneri, et al., "Effect of Feeding Dried Citrus Pulp on Quail Laying Performance and Some Egg Quality Characteristics", *Arch. Geflugelk*, 65(4), pp. 178-181, 2001.

Kutlu, "Influences of Wet Feeding and Supplementation with Ascorbic Acid on Performance and Carcass *Composition of Broiler Chicks Exposed to a High* Ambient Temperature", Citations from Food Science & Tech. Abstracts (FSTA), 2001.

Peacock and Kirk, "Comparative Feeding Value of Dried Citrus Pulp, Corn Feed Meal and Ground Snapped Corn for Fattening Steers in Drylot", *University of Florida*, 2001.

Chapman, et al., "Citrus Feeds for Beef Cattle", *University of Florida*, 2001.

J. Manthey and K. Grohmann. 1996. Concentrations of Hesperidin and other Orange Peel Flavonoids in Citrus Processing Byproducts. Journal of Agricultural and Food Chemistry 44:811-814.

Song-Hae Bok, Sung-Heui Lee, Yong-Bok Park, Ki-Hwan Bae, Kwang-Hee Son, Tae-Sook Jeong and Myung-Sook Choi. 1999. Plasma and Hepatic Cholesterol and Hepatic Activities of 3-Hydroxy-3-methyl-glutaryl-CoA Reductase and Acyl CoA: Cholesterol Transferase Are Lower in Rats Fed Citrus Peel Extract or a Mixture of Citrus Bioflavonoids. Journal of Nutrition 129:1182-1185.

Lemon peel bioflavonoid concentration: 1.3%. M. D. Coll L. Coll, J. Laencina, F. A. Tomás-Barberán. 1998. Recovery of flavanones from wastes of industrially processed lemons. Z.Z. Lebensm Unters Forsch A 206:404-407.

\* cited by examiner

FIG. 1

INFLUENCE OF FEED ON AVERAGE WEIGHT (BWT), FEED CONVERSION (FC), ADJUSTED FEED CONVERSION (AFC), AND MORTALITY

| COMPOSITION | | | DAY 18 | | DAY 50 | | | 7-49 DAYS |
|---|---|---|---|---|---|---|---|---|
| NO | CITRUS PEEL LBS/TON | BWT (KG) | FC (KG FEED/ KG WEIGHT) | AFC (KG FEED/ KG WEIGHT) | BWT (KG) | FC (KG FEED/ KG WEIGHT) | AFC (KG FEED/ KG WEIGHT) | MORTALITY (%) |
| 1 | CONTROL | 0.583±0.007 | 1.252±0.007 | 1.243±0.007 | 2.860±0.023 | 1.987±0.018 | 1.923±0.014 | 6.000±1.309 |
| 2 | 4 | 0.582±0.006 | 1.242±0.003 | 1.231±0.002 | 2.793±0.025 | 1.964±0.014 | 1.915±0.009 | 4.250±0.796 |
| 3 | 8 | 0.581±0.005 | 1.233±0.007 | 1.220±0.007 | 2.824±0.022 | 1.953±0.016 | 1.910±0.010 | 3.250±0.750 |
| 4 | 16 | 0.582±0.007 | 1.244±0.009 | 1.237±0.009 | 2.835±0.024 | 1.959±0.014 | 1.912±0.011 | 3.750±1.098 |
| 5 | 24 | 0.585±0.006 | 1.249±0.006 | 1.241±0.007 | 2.853±0.022 | 1.970±0.018 | 1.919±0.006 | 4.250±1.278 |
| 6 | 32 | 0.577±0.008 | 1.259±0.009 | 1.245±0.008 | 2.890±0.023 | 2.000±0.025 | 1.910±0.010 | 7.250±1.359 |
| P>F | | 0.9631 | 0.1862 | 0.1262 | 0.0916 | 0.4288 | 0.9335 | 0.1288 |

DRIED CITRUS PEEL SUPPLEMENT FOR USE IN COMMERCIAL POULTRY FEED

BACKGROUND OF THE INVENTION

1. Field of Invention

The present invention relates to feed for commercial poultry raising facilities, along with a process for improving and enhancing the commercial value of poultry raised on the feed. The invention also provides a valuable and economically attractive use of dried citrus peel or pulp byproduct or waste in commercial poultry raising operations. Citrus byproduct is used at relatively low levels as a feed supplement to improve the performance of the feed and add significant economic value while maintaining or enhancing bird health.

2. Description of Related Art

Current commercial-scale poultry raising operations house the poultry in confined spaces. Feed and water is made available to the chicks so they can mature into adult birds which typically are intended as a food source. Generally, these are high volume facilities, and efficiency and cost control are extremely important. While the majority of these operations are for chicken production, other poultry can be included, such as turkey, ducks, geese and less common poultry as well.

Poultry feed for these types of commercial operations is formulated in an effort to maximize feed efficiency by improving properties such as live weight gain, feed conversion, adjusted feed conversion and mortality, while seeking to avoid unnecessary feed costs and negative effects on the health of the live birds and the commercial acceptability of the carcass meat for human consumption.

Citrus byproducts have been used extensively for many years (or have been proposed for use) as feed for cattle and other mammals. These uses incorporate citrus byproduct as a food source blended with typical silage sources. Uses or proposed uses of citrus byproducts as feed components for other animals also is generally known. Prior proposals have been made with respect to poultry feed or diet uses for citrus originating materials. Information of interest in this regard includes the following.

Hutton, "Citrus Pulp in Formulated Diets", *Recent Advances in Animal Nutrition in Australia:* 1987, Farrell, ed, Armdale, Australia, discusses including dried citrus pulp in formulated diets for poultry. The suggestion reported in this publication is to utilize 5 percent dried grapefruit pulp. An article referenced in this connection is El Moghazy et al, "Some Neglected Poultry Feed Stuffs from Vegetable and Fruit Wastes," 1982. This article summarizes feeding trials with dried citrus sludge or dried citrus pulp as a feedstuff component at about 7.5 weight percent.

In their "Studies on Utilization of Citrus Byproducts as Livestock Feeds", *Korean Journal of Animal Science,* 26(3), 244–250, 1984 and 27(10), 673–678, 1985, Yang and Chung report information concerning the feeding value of citrus byproducts on broiler chicks and layer hens. Feed blends including between 5 percent and 15 percent by weight of dried citrus pulp and/or peel are noted. These articles suggest an overall conclusion that feeding dried citrus pulp or peel is detrimental to weight gain and feed conversion values. Velloso, "Use of Citrus Pulp in Animal Feeding", University of Sao Paulo, Brazil, 1985, reports that broilers that have reached twenty one days of age can utilize up to 5 percent citrus pulp in their diet. Table 6 of this article reports feeding at 20 percent, 40 percent and 60 percent as an in affect replacement of milo.

Deyoe et al, "Citrus Biflavonoids in Broiler Diets", *Poultry Science,* Volume 41, pages 1088–1090, 1962, reports upon a non-isocholoric addition of as low as 0.5 percent of "citrus bioflavonoids" (from Sunkist Growers, Ontario, Calif.) without specifying or identifying the bioflavonoids. This article acknowledges the bioflavonoid material hesperidin as a bioflavonoid. This article generally reports that mortality was reduced as the level of citrus bioflavonoid inclusion was increased (up to 5 percent), with a poorer feed conversion performance at higher levels.

Tamasaukas et al, "Evaluation of the Efficacy of Salstop and Digestor Broilers (Citrade C.A.), Two Products Derived From Citrus Fruit Seed Extracts, Against Avin Coccidiosis: Floor Pen Studies," FLAP, Parasitol al Dia 20: 118–124, 1996, reports on testing of citrus fruit seed extracts for use against coccidiosis in broilers. Each seed extract was added to the broiler feed at relatively low levels. The extracted components were used at levels as low as 500 grams/ton of food.

Much of this literature indicates that citrus byproducts such as dried citrus peel or pulp can be used as a feed component at levels of about 5 percent or above, but not too far above the generally satisfactory 5 percent level. Even at these relatively low levels, these reported results are mixed in that feed efficiency and bird health aspects can be inconsistent in generally providing positive results in one area at the expense of seeing negative results in another area. This problem is not clearly solved by incorporating only bioflavonoids or extracts from citrus seeds. Besides the reported mixed results, using bioflavonoids or seed extracts adds having to separate the natural combination of citrus waste into individual bioflavonoids or extracts through separation or isolation techniques.

A particularly desirable solution would be to be able to use an inexpensive natural additive to poultry feed in order to enhance feed performance without detrimentally affecting the birds' health or mortality. Effective materials which are byproducts that do not require isolation or extraction to be suitable for use in poultry feed are recognized herein as being of value in this regard when used at levels characteristic of a feed supplement rather than at levels of a component of a feed blend, typically one which is intended to provide food value.

SUMMARY OF THE INVENTION

The present invention addresses these problems by providing a feed supplement source which is inexpensive, widely available and requires no separation of individual bioflavonoids or isolation of components useful as supplements. The invention provides a feed supplement for poultry which is citrus byproduct. The preferred citrus byproduct is dried citrus peel or pulp from citrus operations which generate citrus peel or pulp byproduct or waste during citrus juice extraction. The invention also entails a process for enhancing commercial poultry raising operations, which includes mixing dried citrus peel byproduct material at supplement or additive levels into commercial feed formulations on which poultry chicks are raised until they achieve a size suitable for commercial meat supplies, while enhancing bird health and reducing bird mortality and adjusted feed conversion and while reducing ammonia levels within the poultry pens.

An object of the present invention is to provide an improved feed diet for commercial poultry operations.

Another object of the present invention is to provide an improved poultry raising process through the use of a natural organic source of a feed supplement which controls negative aspects of commercial poultry raising and enhances feed effectiveness.

Another object of this invention is to provide an improved poultry diet composition and poultry raising enhancement process by which a change in the composition of the poultry feed itself addresses substantial problems in poultry raising, such as by lessening ammonia generated by the birds.

Another object of the present invention is to provide an economically beneficial and productive outlet for large quantities of solid byproduct from commercial citrus juice expressing operations.

A further object of this invention is to provide a product and process which enhances the effectiveness of poultry feed in translating into bird weight.

Another object of the present invention is to provide a product and process in the poultry feed business where a supplement remains as intact particles of a naturally occurring byproduct composition.

Another object of embodiments of this invention is to provide improved product and process advances which use effective and inexpensive feed supplement material in its "native" state without requiring extraction, isolation or purification.

These and other objects and advantages of the present invention will be understood from the following description according to preferred embodiments of the present invention, relevant information concerning which is shown in the accompanying drawings.

DESCRIPTION OF THE PREFERRED EMBODIMENTS

In commercial-scale poultry raising or growing operations, the poultry often are restricted to confined spaces for reasons which are well appreciated and are of economic value. The poultry are fed diets intended to enhance growth, production and bird health. The formulated diet is the major cost incurred in commercial poultry production. At times, supplements are added to feed for a variety of objectives. The present invention focuses on a very economical source for a supplement or feed additive for poultry feed.

Typically, the areas on which the growing poultry stand or rest while being fed are generally horizontal and can be considered to be floor surfaces. A material having a degree of absorption properties is spread onto these floor surfaces. That material is referred to as a litter, a bedding, or a bedding litter, these terms being used generally interchangeably herein. In a typical operation, each confined space can take the form of a house or pen within which the birds are confined for all bodily functions, including feeding and waste elimination. Feeding typically is carried out with feeders or containers of feed accessible to the birds and drinker mechanisms, some of which are designed to limit spillage.

Each confined area is intended to be used for raising multiple groups of poultry chicks throughout each year. In effect, one group of chicks is cycled through the confined area until a target is achieved. Typically, the target is a selected number of days of feeding. Other possible approaches can be tied to weight, size or other indications of when a bird achieves the desired level of maturity.

Once the selected benchmark has been reached, the adult birds are processed in a manner known in the art. This includes noting weight gain parameters. Also included are objective inspection of the birds for certain imperfections, and grading of the poultry, typically according to government-imposed standards or criteria. Often ammonia presence has a negative impact on these types of objective indicia.

Imperfections which are monitored include so-called foot pad lesions. This includes inspecting the pad of each foot of each bird and recording a foot pad score. In a typical inspection, a score of "3" indicates that an open sore lesion was detected on the pad. A score of "2" indicates that a healing sore is present, as indicated by scab formation. A score of "1" indicates pad burn (dermis), while a score of "0" indicates both foot pads are normal. In many situations, a score of "0" or "1" indicates poultry which is suitable for sale.

Breast blisters can develop, especially at the locations at which the lower portions of the bird breast typically will contact the soiled litter. In a typical inspection for breast blisters, a breast blister score of "2" indicates a large blister of greater than ¼ inch. A score of "1" indicates a smaller breast blister of not larger than ¼ inch. A breast blister score of "0" indicates that no breast blisters were detected on the bird.

The United States Department of Agriculture provides standards for poultry grading. These are generally available and known in the art. They comprise typical carcass grades of Grade A, Grade B and Grade C. For most applications for human consumption, Grade A is required. In addition, the lower grades have lesser economic value than those of the Grade A variety.

It is suggested that the state of poultry bedding litter can substantially affect conditions such as foot pad lesions, breast blisters, and the USDA Grade. It has been observed that the degree of negative impact on these indicators of bird quality relates to the level of ammonia in the poultry raising pens, such as within the bedding litter during the course of its use. When ammonia levels increase unchecked, ammonia toxicity levels can be reached. Ammonia toxicity in commercial poultry operations has been linked to poultry blindness and dermatitis and to rejection of mature birds delivered to processors.

Ammonia levels in poultry raising pens can make the pens more hospitable breeding grounds for insects, such as beetles, and deleterious microorganisms. Higher ammonia levels can be manifested in deteriorating overall bird health. Besides the readily apparent negatives of raising birds which have health problems, such as mortality, it is recognized here that a more healthy environment enhances the efficiency with which poultry feed is converted to poultry weight.

Proper feed supplements according to the invention have been found to reduce the level of ammonia within the pens including within the litter. Excess ammonia within the poultry raising environment can lead to poultry air sack damage. Bacterial infections and lung collapse also can be the result of ammonia exposure. Lowering ammonia levels by any means can be very advantageous.

Feed additive or supplement compositions of this invention also are advantageous to bird health in positively impacting mortality or related bird health issues. Poultry such as broilers experience cardiovascular difficulties and can lead to bird death. The economic detriment of these unfortunate events is made more negative when the animal dies near the end of the growing period, since almost a full investment in the bird has been made by that time, which then is lost.

One suspected cause of such bird mortality or health damaging issues is a negative reading with respect to cholesterol levels. A poor ratio of high density cholesterol level to low density cholesterol level (HDL:LDL ratio) is generally understood to be detrimental to bird health. A higher HDL:LDL ratio is preferable to a lower one. A higher HDL level is recognized as being more healthful than a lower HDL level. Another factor which generally negatively impacts bird health is an elevated fat level. The invention addresses these matters in that typically HDL levels and HDL:LDL ratios are raised, and/or fat levels are lowered.

Supplements for feed according to this invention provide advantageous feed conversion results while Maintaining bird weight characteristics. Bird weight is determined by body weight measurement, typically done by measuring the weight of each bird in confined pens. Feed performance data for feed containing the supplements according to the invention exhibit improved feed conversion values and improved adjusted feed conversion values. Usually, feed conversion is calculated on a pen basis by determining the total feed consumed in a pen and dividing same by the total weight of the surviving birds. Calculating the adjusted feed conversion also shows positive results. Typically, adjusted feed conversion is calculated by using the total feed consumption in a pen divided by the total weight of surviving birds plus the weight of the birds which died or had to be removed from that pen, typically due to bird weakness.

The feed supplement according to the invention is preferably one which is readily available and relatively inexpensive. It is a byproduct or waste from commercial citrus juice operations. One particular advantage of the present invention is the ability to avoid having to further treat this waste product (aside from a simple size-reduction step) before being able to realize its beneficial and valuable effects at low, supplement or additive levels in poultry feed diets.

In an especially advantageous aspect of the invention, the citrus byproduct provides a naturally occurring combination or complex mixture of citrus byproducts. This naturally occurring combination need not be subjected to treatment beyond that currently conventionally practiced in the citrus juice extraction industry. The only additional step of processing the traditional byproduct is grinding this commodity so as to facilitate its mixing into the poultry feed in a substantially uniform manner.

With further reference to the additive or feed supplement characteristic of the whole byproduct or waste according to the invention, same is characterized by being included within the diet composition at a level of not greater than about 1 weight percent. Concentrations above this general level are defined herein as being a feed component, typically a component which is intended to provide food value to the feed composition, rather than supplement performance in a non-caloric manner.

The supplement according to the invention does not add any significant feed value to the feed diet composition fed to the poultry. Typically, the citrus feed supplement is at a level of not greater than about 2 weight percent. Preferably, the feed supplement according to the invention is at a level of not greater than about 1.5 weight percent. An especially preferred range is between about 0.2 weight percent and about 1 weight percent. All of these weight percentages are based upon the total weight of the diet feed composition. Usually, the citrus feed supplement will be at a level of not more than about 32 pounds per ton of diet feed composition, preferably not more than about 24 pounds. An especially preferred range is between about 4 and about 16 pounds per ton.

The feed supplement naturally contains components typically found in citrus peel or pulp byproduct or waste from citrus fruit juice extracting facilities. In customary processing operations at these facilities, the citrus peel or pulp byproduct is dried in accordance with generally known industry practices. It is understood that such peel or pulp byproduct includes extraction residue in addition to peel and pulp. Included is citrus peel, citrus pulp, citrus flavedo, citrus albedo and citrus rag. The product of traditional citrus residue is processed into so-called dried citrus pulp and/or peel.

This processing typically includes a so-called liming process in which the raw, wet citrus residue is treated with calcium oxide ("quicklime"), pressed and dried into loose dried pulp. This can serve as the dried citrus byproduct as used herein. Details on the production of this loose dried pulp can be found in Braddock, *Handbook of Citrus By-Product and Processing Technology*, Chapter 10, "Dried Pulp, Pellets and Molasses," pages 135–148, incorporated by reference hereinto.

Components typically naturally found in this dry citrus peel or pulp byproduct or waste include pectin and demethylated pectin. Other components are flavonoids including naringin, naringenin, narirutin, hesperidin and hesperetin as well as polymethoxylated flavones including sinensetin, tangeretin and nobiletin. Also included are limonin glucosides and tocopherols.

Food grade acids such as citric acid and malic acid and antioxidants including ascorbic acid, carotenoids, beta-carotene, beta-cryptoxanthin, lycopene, and xanthophylls typically are found in citrus byproducts. Other components are cellulose, hemicellulose and starch. All of these chemicals are in a natural state and in a natural combination in the citrus byproduct or waste of the invention.

The dried citrus peel or pulp byproduct or waste as discussed herein is a readily available and relatively inexpensive source for the diet supplement according to the invention. Dried citrus byproduct incorporates one, some, many or all of the chemicals or components noted above and elsewhere herein. For economic and positive environmental and organic reasons, the components can be used as is and without requiring extraction, purification or isolation of the individual chemicals. They can be provided in their native state and in the valuable combinations already present in dried citrus peel and/or pulp. When thus provided, the citrus byproduct avoids the use of chemical extraction agents such as organic solvents which might not be totally appropriate for use in a feed supplement. This provides a supplement which is heterogeneous in terms of components present within the supplement.

One typical form of dried citrus waste material is referred to as flaked material or citrus peel/pulp flake. This flaked dried citrus byproduct can include fine particles on the order of 1 percent by weight, usually less than 10 percent by weight, with at least 10 percent by weight of irregularly shaped particles in excess of ¾ inch in size. Typical moisture contents of this flaked dried citrus byproduct range between about 5 and about 12 weight percent moisture, typically between about 7 and 11 weight percent, based upon the total weight of the byproduct. Where greater moisture reduction cost is acceptable, a moisture content of between about 8 and 9 weight percent can be practiced.

Citrus waste can also be reshaped into pelletized form. At times, this pelletizing is carried out to facilitate handling. Often, dried citrus waste is in this form for a traditional use of same as feed for ruminants. Dried citrus byproduct waste, peel and/or pulp can be provided in this pelletized form.

Whether provided as citrus flake or citrus pellets, the byproduct is ground or comminuted to a particle size on the order of about 2 mm or less.

One potential advantage of the natural feed supplement according to the invention is that it has the potential for substantially reducing or eliminating the use of pesticides and antibiotics. This can contribute to providing "pesticide free" poultry products, while reducing the cost of commercial poultry production. Another beneficial fact is reduction of the fat content of processed breast meat. In addition, the supplement according to the invention is compatible with other feed stock ingredients, including vitamins and inorganic components.

Certain enhancements of the present poultry feed supplement are illustrated by the following.

EXAMPLE 1

A study was conducted to evaluate poultry feed formulations for broiler chickens placed upon traditional shaved pine litter within pens of the type typically used in poultry raising facilities. The testing was carried out over a typical growing period for broiler chickens, while monitoring certain parameters of importance to the poultry industry. The testing protocol strove to maintain all environmental, feeding and other conditions consistent for all birds, with the exception of the diet feed composition.

Study Protocol

In accordance with typical industry practices, the diets for each pen were varied as follows. For days 0 through 18, the birds were given a 22 percent starter diet in crumbled form. 1,100 pounds of feed containing a coccidiostat feed additive (salinomycin at 50 grams per ton) were prepared for early feeding. During days 18 through 35, a grower diet containing 20 percent pelleted grower feed formulation was combined with the basal feed containing the same feed additives and feed additive concentrations as in the starter diet. 2,000 pounds of this grower diet were prepared. A finisher diet was fed from day 35 to the final day of the study. 2,6000 pounds of this feed was formulated to include 18 percent finisher diet in pelleted form.

The species involved in the testing was broiler chicken of commercial production strain and Cobb×Cobb breed, the supplier being Cobb-Vantress, Inc. of Cleveland, Ga. The birds were supplied as male and 1 day of age upon receipt (day 0 in the study). Pen cards were used for identification. The total number of pens used in the study was 48, with approximately 52 birds being in each pen at the initiation of the study. At day 7, each pen was targeted to have 50 birds. Six different feed compositions were used, and each composition was experienced by a target of 400 birds, there being 8 pens for each feed composition.

The compositions were assigned to individual pens using a complete randomized block design, with the composition assigned to each pen being by way of a computer-generated assignment period. Concrete floor pens within an environmentally controlled facility were used. All birds were placed on previously used pine wood shavings litter, which was top dressed with approximately one inch of clean pine wood shavings. Lighting followed a typical commercial program. Within the pens, the floor space was approximately 0.8 square feet per bird. The housing conditions simulated conditions in commercial poultry raising facilities.

The feed compositions were as follows. Composition 1 was the control, namely 100% of the basal feed. The feed was stored at ambient temperature and humidity, and all of the compositions were formulated to be isocaloric. Each of Compositions 2 through 6 contained a specified level of comminuted citrus byproduct as received from a commercial orange juice extraction byproduct or waste flow treated to dried pulp and pelletized. This citrus byproduct is generally in accordance with Chapter 10 of Braddock, *Handbook of Citrus By-Products and Processing Technology*.

Composition 2 included 4 pounds per ton (0.2 weight percent) of the citrus byproduct. Composition 3 included 8 pounds per ton (0.4 weight percent) of the citrus byproduct. Composition 4 included 16 pounds per ton (0.8 weight percent) of the citrus byproduct. Composition 5 included 24 pounds per ton (1.2 weight percent) of citrus byproduct. Composition 6 included 32 pounds per ton (1.6 weight percent) of citrus byproduct. Each weight percent value is based upon the total weight of the feed composition.

The birds were vaccinated for Mareks at the hatchery, and they were vaccinated for Newcastle and Infectious Bronchitis (NCB), B1 Type, B1 Strain, Massachussets Type, live virus, using a spray cabinet. No other vaccinations or treatments were used during the study, except the coccidiostat.

Water was provided ad libitum throughout the study by way of five automatic nipple drinkers within each pen. For approximately the first 4 days, a floor-placed gallon drinker also was placed in each pen to facilitate access by the small chicks. A clean and constant water supply was provided to the birds.

The feed was provided ad libitum throughout the study by way of two 17-inch diameter hanging tube feeders within each pen. A chick feeder tray also was placed in each pen for approximately the first 7 days. All feed added and removed from the pens was weighed and recorded.

Litter samples were collected from each pen within the time frame of the end of the study for ammonia analysis purposes. Samples were collected from pens having feed compositions 1, 3 and 4 (approximately 20 kilograms each). The 20 kilograms of each used litter material was placed in a 32 gallon plastic barrel. The barrel had an approximately ¼ inch hole drilled in the side, approximately 6 inches above the top of the litter. The hole was covered with duct tape, and the lid was taped down. The barrels were placed in a trailer at about 90° F. Approximately 24 and 48 hours after placing the barrels of litter into the heated trailer, ammonia readings were taken through the predrilled holes. The readings were taken through Precision gas detector tubes (5–260 ppm or 50–900 ppm).

The test facility, pens and birds were observed at least twice daily for general flock condition, lighting, water, feed, ventilation, daily maximum and minimum temperatures, and any unanticipated events Mortalities or removals occurred occasionally, such being removed from the pen and necropised to determine probable cause of death. Bird weight, day of removal, reason for culling and necrospy findings of all dead and culled birds was recorded on pen mortality and necrospy records.

Birds were weighed on a pen basis on approximately day 18 and day 50. The feed remaining in the feeders was weighed and recorded at each body weight period. The feed intake was calculated by subtracting the feed remaining in the feeders from the amount of feed added to the pen.

Performance data were summarized by average weight per bird on a pen basis. The average feed conversion was calculated using the total feed consumption in a pen (for that period) divided by the total weight of surviving birds. Adjusted feed conversion was calculated using the total feed consumption in a pen divided by the total weight of surviving birds plus the weight of birds that died or were removed from that pen.

On day 50, blood samples were collected from two birds (separate bird used for plasma and for serum) from all pens of Treatments 1, 3 and 4. The samples were refrigerated overnight and then were centrifuged at approximately 2,300 rpm for about 10 minutes. The serum and plasma were removed. Samples were pooled by treatment and were analyzed for hesperidin and cholesterol analysis.

After the blood was collected from the birds, the birds were sacrificed. Samples of breast meat were subjected to cholesterol and percent fat analysis.

Weight and Feed Conversion Results

Figure 1:
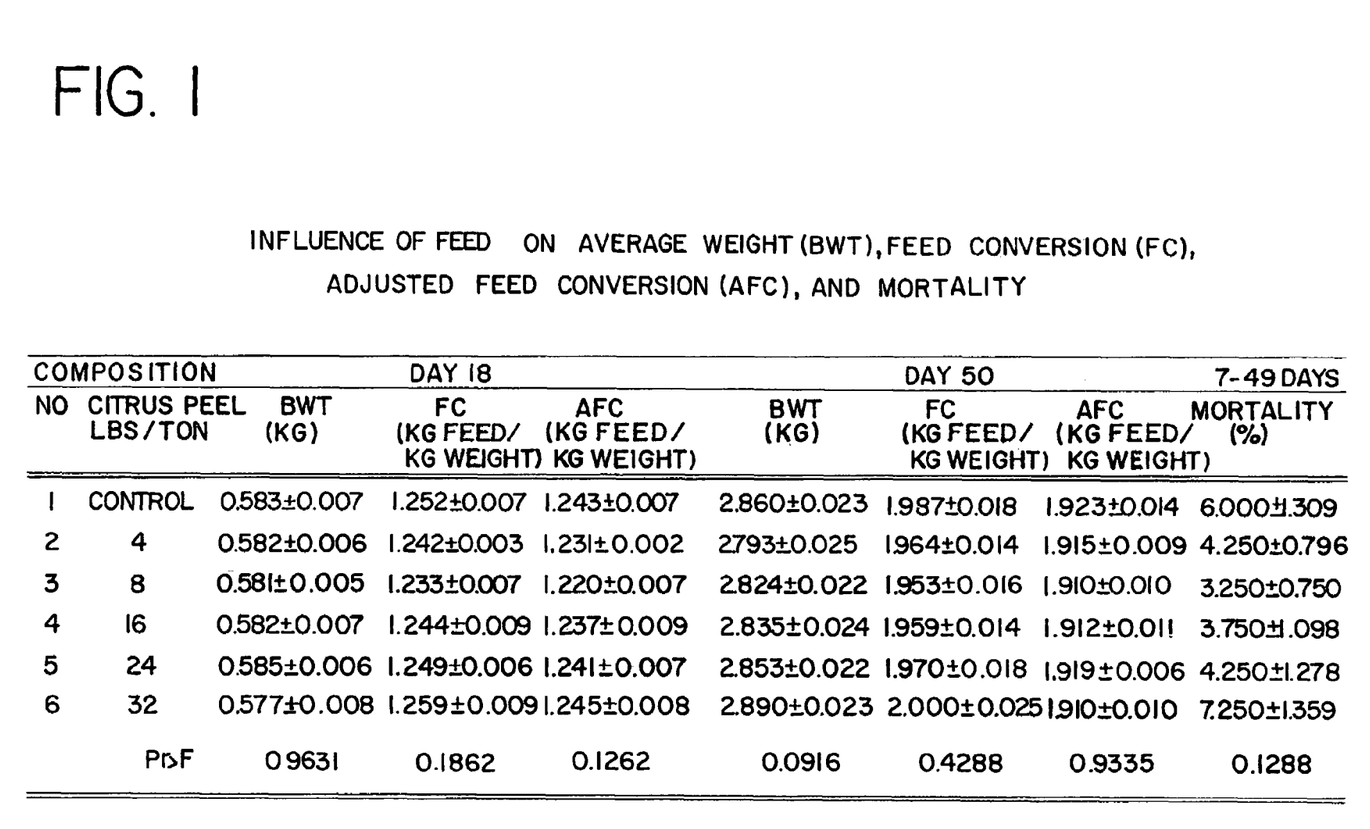
FIG. 1 is a tabulation of weight, feed and mortality data generated during evaluation of citrus peel products as poultry broiler feed additives.

Performance data for birds at 16 days of age are reported in FIG. 1, from which the following is observed.

Figure 2:
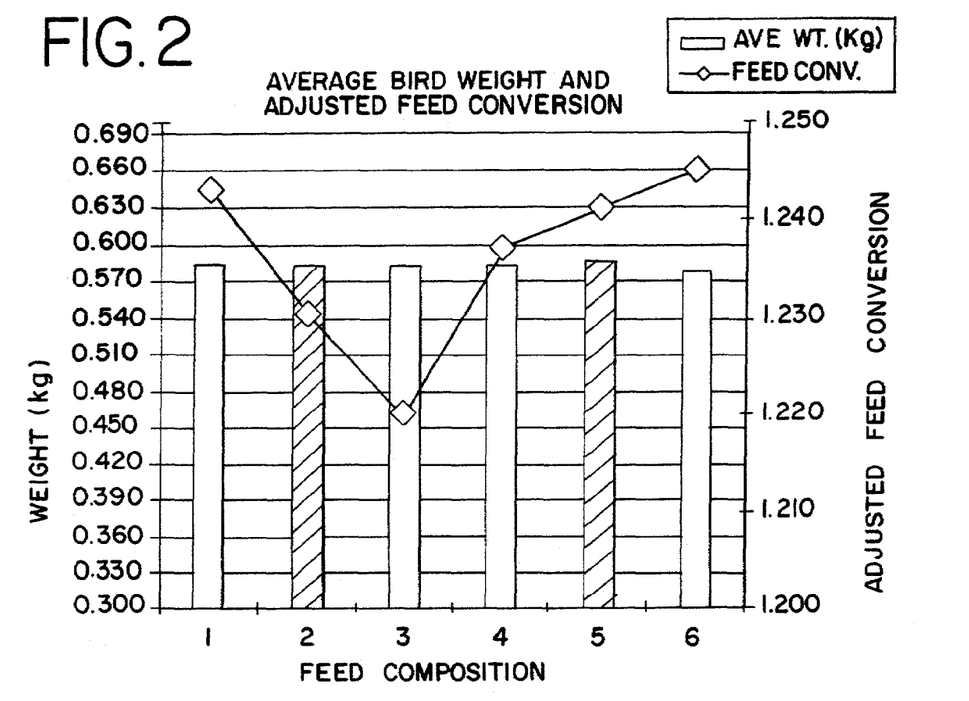
FIG. 2 is a plot of data and a bar graph report of poultry broiler weight and feed conversion 18-day data from FIG. 1.

For control Composition 1, the average bird weight at day 18 was 0.583 kilograms. For the feed Composition 2, the average bird weight at day 18 was 0.582 kilograms. For birds on feed composition 3, the average bird weight was 0.581 kilograms. For composition 4, it was 0.582 kilograms. For composition 5, it was 0.585 kilograms, and for composition 6 it was 0.577 kilograms. These substantially equal weights are illustrated in FIG. 2.

When the total feed consumed by these birds was divided by this total bird weight for birds on each respective feed composition, the feed conversion was determined. An adjusted feed conversion was determined by including the weight of birds that died or were removed in order to take into consideration the actual amount of feed converted into bird weight.

The resulting adjusted feed conversion at day 18 was 1.243 for the birds raised on the control feed Composition 1, while those on any of feed Compositions 2, 3 or 4 were considerably lower at day 18, namely 1.242, 1.233 and 1.244, respectively. This illustrates that, with feed compositions 2, 3 or 4, significantly less feed was required to attain bird weight of the birds raised on control feed Composition 1. These average weight and adjusted feed conversion values are set out in visual form in FIG. 2.

As reported in FIG. 1, for control Composition 1, the average bird weight at day 50 was 2.860 kilograms. For feed Composition 2, the average bird weight at day 50 was 2.793 kilograms. For birds on feed Composition 3, the average bird weight at this time was 2.824 kilogram. For Composition 4, it was 2.835 kilograms. For Composition 5, it was 2.853 kilograms, and for Composition 6, it was 2.890 kilograms. These weights are illustrated by the bar graph representations in FIG. 3.

Figure 3:
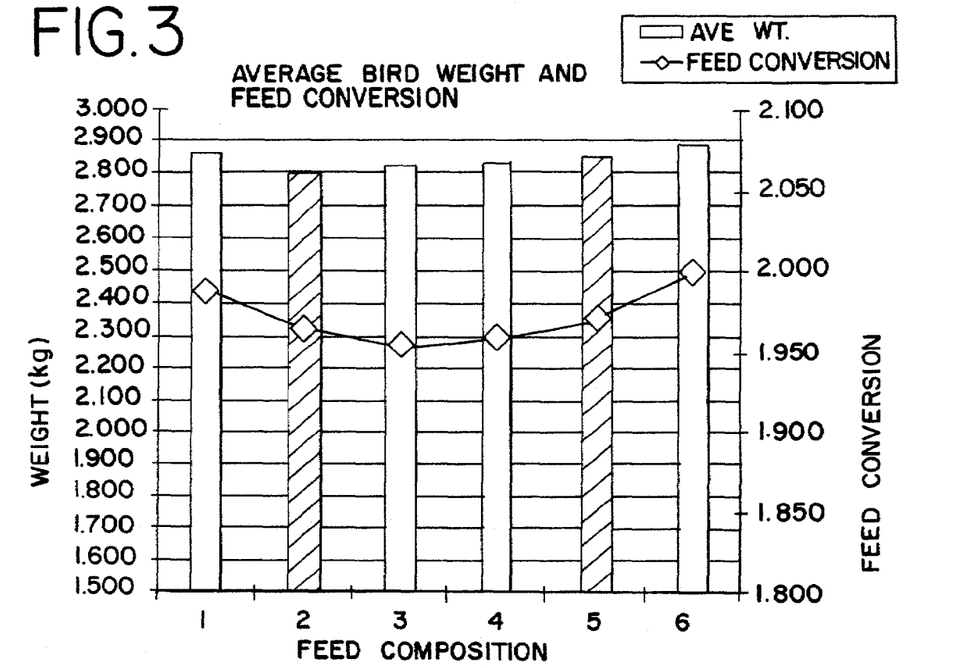
FIG. 3 is a plot of data and a bar graph report similar to FIG. 3, but of 50-day data.

The adjusted feed conversion values are reported by the data plot in FIG. 3. These day 50 calculations show the feed conversion for the control to be 1.987 kilograms gain per kilogram feed. Feed Composition 2 (0.2 weight percent citrus supplement) gave a feed conversion of 1.964 kilograms gain per kilogram feed, a reduction of 0.023 in adjusted feed conversion compared to the control. For feed Composition 3 (0.4 weight percent citrus supplement), the feed conversion was 1.953 kilograms gain per kilogram feed, a reduction of 0.034. For feed Composition 4 (0.8 weight percent citrus supplement), it was 1.959 kilograms gain per kilogram feed, a reduction of 0.028 in adjusted feed conversion compared to the control. For feed Composition 5, it was 1.970, and for feed Composition 6, it was 2.000 kilograms gain per kilogram feed. Adjusted feed conversion reductions of this magnitude represent substantial economic value in the commercial poultry industry.

Mortality

Figure 4:
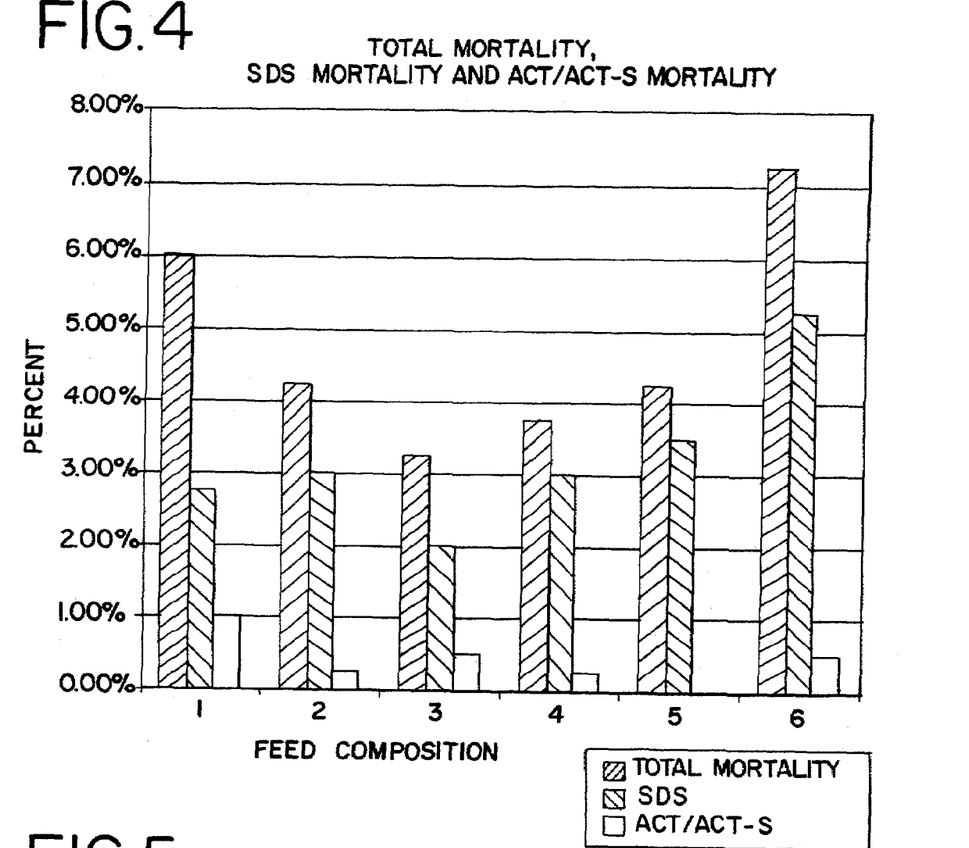
FIG. 4 is a bar graph representation of mortality data during the 50-day study of the data reported in FIG. 1.

The mortalities from day 0 to the end of the study were collected and totaled for each feed composition. Total mortality, SDS (sudden death syndrome) mortality, and ACT/ACT-S (ascites/ascites plus SDS) mortality are reported in bar graph form in FIG. 4 for days 7 through 50 of this study. Total mortality was almost halved for feed Composition 3 when compared with control feed Composition 1. Feed Compositions 2, 4 and 5 also had reduced mortality. This magnitude of reduction in mortality translates to substantial added revenue to a commercial poultry operation using the citrus supplement according to the invention.

Figure 5:
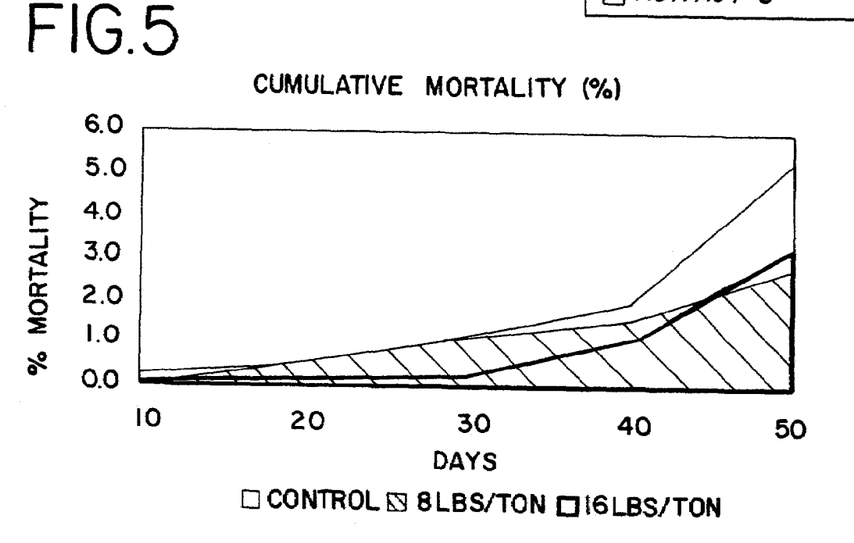
FIG. 5 is a plot of cumulative mortality concerning the 50-day study which generated the data of FIG. 1.
Figure 6:
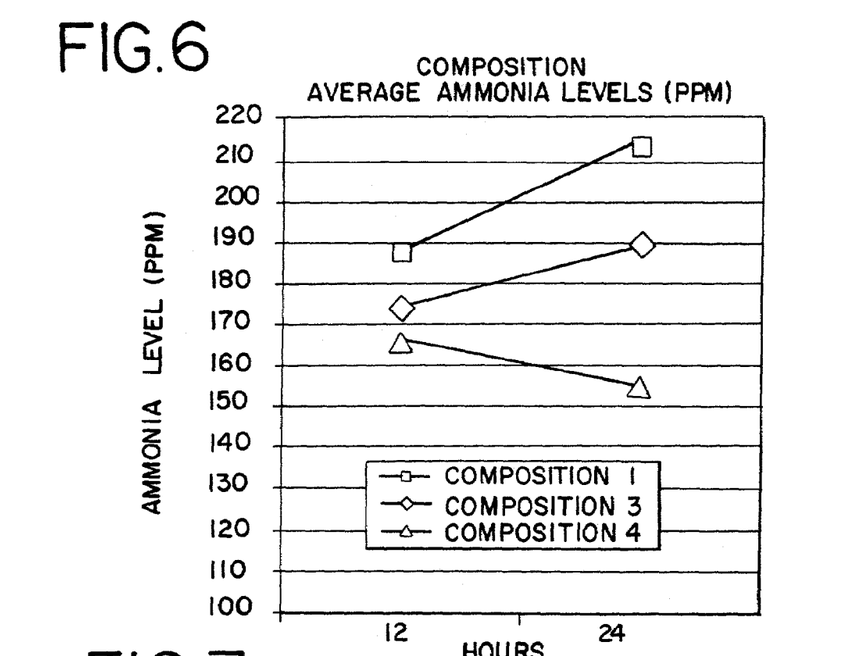
FIG. 6 is a plot of ammonia levels present in litters from pens used in the study which generated the data of FIG. 1.

It is instructive to consider the cumulative mortality summary provided graphically in FIG. 5. These data illustrate that mortality events were twice as prevalent in about the last five days of the study for the control Composition 1 when compared with either feed Composition 3 (8 pounds per ton) or feed Composition 4 (16 pounds per ton). This illustrates an important advantage of the invention in that significantly fewer mature-bird deaths occurred with these invention compositions than with the control composition. This means that the chicken farmer would lose twice as many birds at the end of the growing cycle when using the control rather than the invention. Thus, the chicken farmer would lose the value of all of the feed invested in those birds. The fewer number of near end term deaths for these feed compositions of the invention indicates that the chicken farmer stands to lose fewer birds which have consumed nearly a full complement of feed for such birds.

Ammonia Levels

At the end of the study of this Example 1, litter was removed and tested for ammonia as specified above. Ammonia levels were then measured using a Matheson toxic gas detector, Model 8014KA and Precision gas detector tubes #105SC (5–260 ppm). The ammonia levels of control feed Composition 1 were at 188 ppm after 12 hours and were in excess of 213 ppm at 48 hours. For Composition 3, the respective ammonia levels were approximately 174 ppm and 189 ppm. For Composition 4, the respective ammonia levels were approximately 166 ppm and 155 ppm.

Considering the 24 hour volatile ammonia levels, each of the citrus-supplemented feed compositions substantially reduced volatile ammonia levels. Same was reduced by 11 percent by Composition 3 with respect to the control basal diet. The reduction was 27 percent for Composition 4 with respect to the control basal diet. This illustrates an important trend of lower ammonia level in the feed with the citrus supplement of the invention. This indicates a connection between ingested citrus feed supplement and reduction of detrimental ammonia levels from bird excretions.

Cholesterol and Fat Analysis

Figure 7:
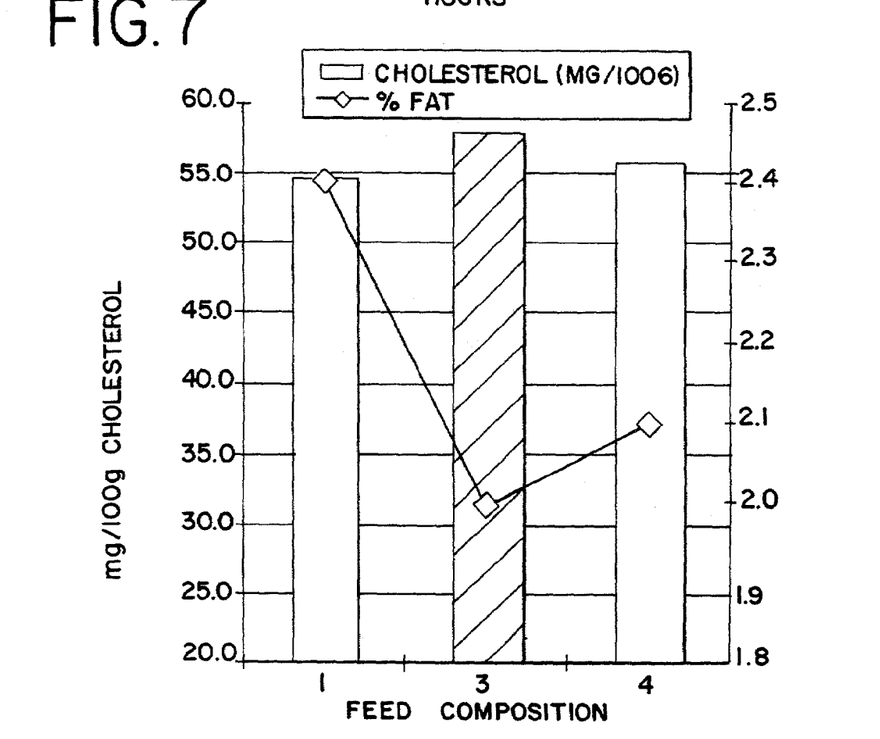
FIG. 7 is a plot and bar graph of cholesterol data developed in conjunction with the data collection of FIG. 1.

Cholesterol and fat analysis of breast meat from control feed Composition 1 and from treatment Compositions 3 and 4 are reported in FIG. 7. The percent of fat in the breast meat was reduced (approximately 14 percent) in birds fed the feed containing the citrus supplement when compared with the control not containing any citrus supplement.

While total cholesterol readings did not vary much among breast meat from birds among the compositions, a break down of HDL cholesterol and LDL cholesterol is instructive. The following data were generated from bird blood collected as noted above.

Birds fed the control Composition 1 diet had a total cholesterol level of 156.5 mg/dL, which included 92.5 mg/dL of HDL. This represented an HDL level of 59 percent of the total cholesterol. Hesperidin was at 22.3 nM. For the birds fed with the feed containing citrus pulp or peel at the 8 pounds per ton level (Composition 3), the total cholesterol level was 160.5 mg/dL with 98.0 mg/dL being HDL cholesterol. The HDL was 61 percent of the total cholesterol. Hesperidin was at 37.3 nM. For the blood from chickens fed with the diet containing 16 pounds per ton (Composition 4), the total cholesterol was 152.6 mg/dL, of which 95.3 mg/dL was HDL cholesterol. The HDL was 62 percent of total cholesterol. Hesperidin was at 34.3 nM.

HDL:LDL ratios were as follows. For the control Composition 1, the ratio was 1.44. For citrus-supplemented Composition 3, the HDL:LDL ratio was 1.57. For citrus-supplemented Composition 4, the HDL:LDL ratio was 1.66. This illustrates advantageous elevation of the HDL:LDL ratio in these chickens.

EXAMPLE 2

Chicken broilers were fed feed compositions containing varying levels of citrus peel. The citrus peel was provided as pellets, which were ground using a corn grinder. In all but the control, this ground peel was mixed with the basal feed having an approximate nutrient composition of 6.0 percent protein, 2.0 percent fat, 16.6 percent fiber and 3.0 percent calcium. The diets were fed ad libitum, the same diet being fed for days 0 through 15 in the case of each diet composition. No other feed additives were included in the diets. Commercial broiler chickens, Cobb×Cobb 0 or 1 days of age, were used. The respective feed was provided for 144 birds for each feed composition, there being 12 birds per cage.

The feed compositions were as follows: Composition 1 was the control, having no citrus supplement added thereto. Feed Composition 2 had 4 pounds per ton of a supplement of the citrus peel blended thereinto. Composition 3 had 16 pounds per ton of the citrus feed supplement added thereto. Composition 4 had 32 pounds per ton of the ground citrus material added to it. Composition 5 had 64 pounds per ton of the ground citrus material added to it. Composition 6 had 128 pounds per ton of the ground citrus material added to it.

A filler mixture was formulated that was included in the treatment diets in place of the citrus peel product. This provided for nutrient compositions being fairly equal among the treatment groups. Each of the diets were calculated to have 1,399.97 calories per pound of feed. The calculated crude protein was 21.99 percent. The calculated moisture was 11.78 percent. The calculated crude fat was 7.7631 weight percent. The calculated crude fiber was 3.6419 weight percent. The calculated ash was 4.5008 weight percent. The calculated calcium was 0.9512 weight percent.

Brooding battery cages were used which had approximately 30 inches by 40 inches of floor space and 11 inches of height. Each cage contained 12 birds. All feed added and removed from each cage was weighed. Birds were vaccinated for Maereks at the hatchery. Upon receipt at the research facility, the birds were orally vaccinated for Newcastle and Infectious Bronchitis treatment was by way of the drinking water. Mortality and culling data were recorded. Birds were weighed by cage on day 0 and on day 15. Feed intake for each cage was determined for days 0 through 15. Feed conversion for each cage was calculated based on day 15 cage body weight. Adjusted feed conversion was calculated by accounting for mortalities and removals throughout the study.

Figure 8:
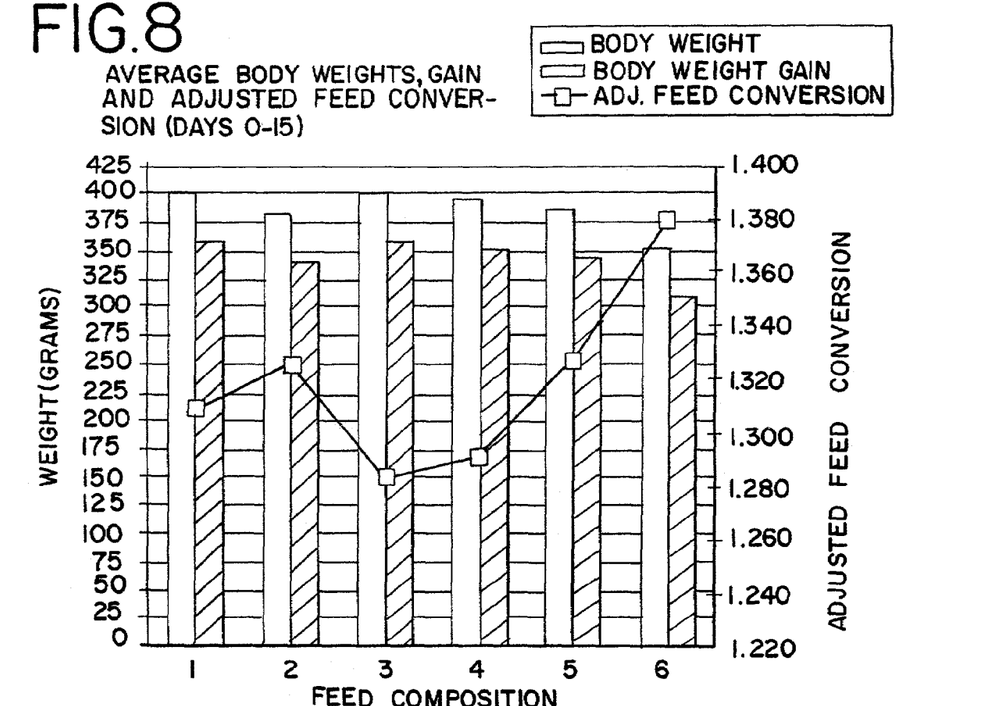
FIG. 8 is a plot and a bar graph representation of weights and feed conversion data during a feed study at different levels of citrus peel addition.

FIG. 8 reports data from this battery cage study. Composition 6 (128 pounds of ground citrus per ton of feed, or 6.4 weight percent) was significantly inferior in terms of feed conversion than the control Composition 1 and other compositions. The birds fed Composition 3 and Composition 4 (16 pounds and 32 pounds per ton of feed, or 0.8 weight percent and 1.6 percent, respectively) performed best according to these data.

The actual data which are illustrated in FIG. 8 are as follows: Control Composition 1: 401 grams day 15 average body weight, 359 grams body weight gain over day 0 through day 15, and 1.309 adjusted feed conversion. For Composition 2, these values were 384 grams, 342 grams and 1.326. For Composition 3, these values were 403 grams, 361 grams and 1.284. For Composition 4, these values were 396 grams, 354 grams and 1.292. For Composition 5, these values were 389 grams, 347 grams and 1.328. For Composition 6, these values were 356 grams, 314 grams and 1.381.

EXAMPLE 3

A battery cage study was conducted with poultry as generally discussed in Example 2 and with a protocol substantially as discussed in Example 2. Here, the study lasted for 27 days, and the diets differed from those of Example 2 in the following respects. Composition 1 continued to be the control feed having no added citrus supplement. Composition 2 added 8 pounds per ton (0.4 weight percent) of the ground citrus byproduct described in Example 2. Each of feed Compositions 3, 4 and 5 were supplemented with isolated and purified compounds which are found in citrus peel byproduct. Composition 6 contained a supplement which was a combination of these three chemical compounds. Each of the compositions was formulated so that the respective feeds were isocaloric.

More particularly, Composition 3 contained 104 ppm of hesperidin. Composition 4 contained 4.3 ppm of limonin glucoside. Composition 5 contained 0.12 weight percent of citrus pectin, based on the total weight of this feed composition. Composition 6 combined each of these three chemical compounds at these specified concentrations.

Figure 9:
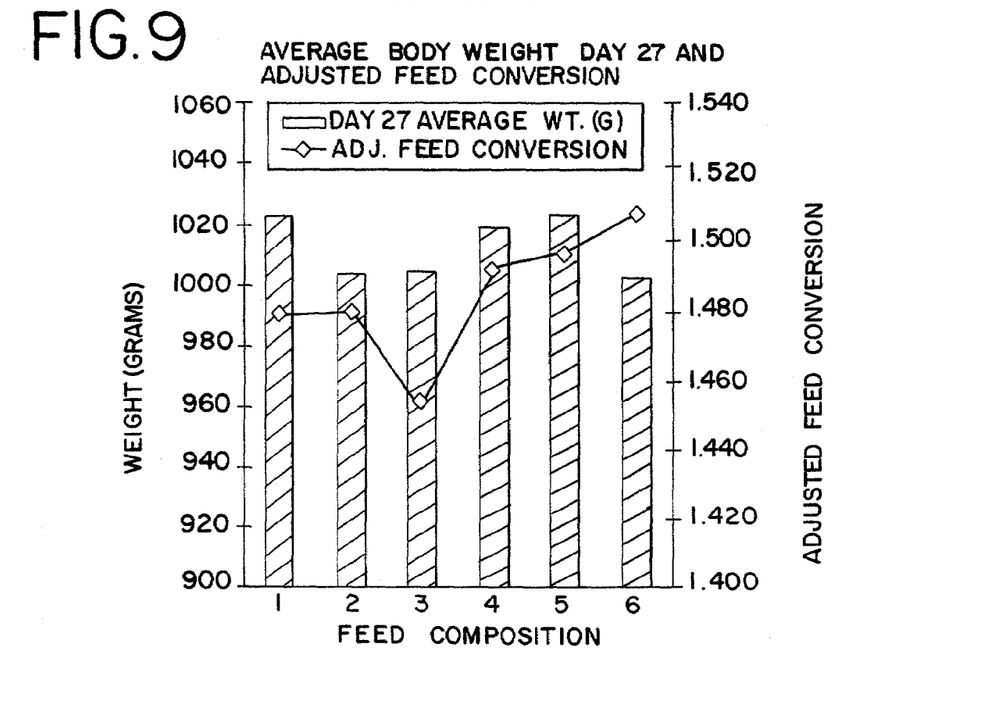
FIG. 9 is a data plot and a bar graph of weight and feed conversion information including that of chemicals known to be present in citrus peel.

FIG. 9 shows data collected during this study period. And the data are as follows. Control Composition 1 had an average weight at day 27 of 1,026 grams and an adjusted feed conversion of 1.479. Natural make-up citrus peel byproduct Composition 2 had a day 27 average weight of 1,004 grams and adjusted feed conversion of 1.480. Composition 3, supplemented with hespridin, had a day 27 average weight of 1,005 grams and an adjusted feed conversion of 1.451. Composition 4, supplemented with a limonin glucoside, had a day 27 average weight of 1,019 grams and an adjusted feed conversion of 1.93. Composition 5, supplemented with citrus pectin, had a day 27 average weight of 1,023 grams and an adjusted feed conversion of 1.496. Composition 6, which contained all three of the chemical additives, when used as the feed in this study, resulted in an average body weight of 1,005 grams and an adjusted feed conversion of 1.507.

In this study, the hesperidin was 97 percent pure as provided by Aldrich Chemical Company. The limonin glucoside was mixed limonin glucosides at a 99 percent purity level provided by U.S.D.A.-ARS, Albany, Calif. The citrus pectin chemical component comprised low methoxyl pectins from citrus, being 99.5 percent pure, obtained from SKW Biosystems.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A poultry feed diet composition for poultry, the poultry feed diet composition comprising a balanced feed composition plus a citrus feed supplement, said feed supplement being particles of a substantially untreated citrus byproduct of dried citrus peel or pulp from citrus operations which generate citrus peel or pulp byproduct or waste during citrus juice extraction, and said citrus feed supplement being at a concentration of not more than 1.5 weight percent, based on the total weight of the poultry feed diet composition.

2. The poultry feed diet composition in accordance with claim 1, wherein said citrus feed supplement is at a concentration of at least about 0.2 weight percent and up to about 1 weight percent, based upon the total weight of the poultry feed diet composition.

3. The poultry feed diet composition in accordance with claim 1, wherein said citrus feed supplement is at a concentration of not greater than about 24 pounds per ton of feed diet composition.

4. The poultry feed diet composition in accordance with claim 1, wherein said citrus feed supplement is at a concentration of at least about 4 pounds and up to about 16 pounds per ton of feed diet composition.

5. The poultry feed diet composition in accordance with claim 1, wherein said citrus byproduct has a moisture content of between about 5 and about 12 percent by weight, based upon the total weight of the citrus byproduct.

6. The poultry feed diet composition in accordance with claim 1, wherein said citrus feed supplement particles comprise dried citrus byproduct flake.

7. The poultry feed diet composition in accordance with claim 1, wherein said citrus feed supplement eitiusparticles comprise pelletized dried citrus byproduct.

8. The poultry feed diet composition in accordance with claim 1, wherein said citrus byproduct of the citrus feed supplement is a dried and limed byproduct which had been ground to a particle size of about 2mm or less to provide said citrus particles.

9. The poultry feed diet composition in accordance with claim 1, wherein said citrus byproduct includes a combination of components, each in its native state as present in dried citrus byproduct from juice extraction equipment.

10. The poultry diet feed composition in accordance with claim 9, wherein said citrus byproduct components include pectin, demethylated pectin, citric acid, folic acid, ascorbic acid, a carotenoid, beta-carotene, beta-cryptoxanthin, lycopene, xanthophyll, naringin, naringenin, narirutin, hesperidin, hesperetin, sinensetin, tangeretin, nobiletin, alpha-tocopherol, limonin, nomolin, a limonin glucoside, and d-limonene.

11. The poultry diet feed composition in accordance with claim 9, wherein said citrus byproduct components include a pectin, a food grade acid, ascorbic acid, a carotenoid, a citrus originating flavonoid, a citrus originating polymethoxylated flavone, and a tocopherol.

12. A process for enhancing commercial poultry operations, comprising:

supplying a confined space having a poultry feeding area;

providing a poultry feed diet composition which comprises a balanced feed composition and a citrus feed supplement, said citrus feed supplement being particles of a substantially untreated citrus byproduct of dried citrus peel or pulp from citrus operations which generate citrus peel or pulp byproduct or waste during citrus juice extraction, said citrus feed supplement being at a concentration of not more than 1.5 weight percent, based on the total weight of the poultry feed diet composition; and placing said poultry feed diet composition within the poultry feeding area and confining poultry in the confined space, thereby having the poultry feed on the poultry feed diet.

13. The process in accordance with claim 12, wherein said citrus feed supplement is at a concentration of at least about 0.2 weight percent and up to about 1 weight percent, based upon the total weight of the poultry feed diet composition.

14. The process in accordance with claim 12, wherein said citrus feed supplement is at a concentration of at least about 4 pounds and up to about 16 pounds per ton of feed diet composition.

15. The process in accordance with claim 12, wherein said citrus byproduct has a moisture content of between about 5 and about 12 percent by weight, based upon the total weight of the citrus byproduct.

16. The process in accordance with claim 12, wherein said citrus feed supplement particles comprise dried citrus byproduct flake.

17. The process in accordance with claim 12, wherein said citrus feed supplement particles comprise pelletized dried citrus byproduct.

18. The process in accordance with claim 12, wherein said citrus byproduct of the citrus feed supplement is a dried and limed byproduct which had been ground to a particle size of about 2 mm or less to provide said citrus particles.

19. The process in accordance with claim 12, wherein said citrus byproduct includes a combination of byproduct components, each in its native state as present in dried citrus byproduct from juice extraction equipment.

20. The process in accordance with claim 12, further including:
    continuing said confining and having the poultry fed for a length of time adequate for the poultry to grow to poultry of a size suitable for commercial meat supply use; and
    providing through said process a quality characteristic of the thus raised poultry which is improved when compared with the same characteristic of poultry chicks raised in the same manner on said balanced feed composition in the absence of said citrus feed supplement.

21. The process in accordance with claim 20, further including calculating an adjusted feed conversion value for the poultry raised according to the process, said adjusted feed conversion value being less than that of poultry raised on a feed comprising said balanced feed composition and a feed supplement comprised of hesperidin, limonin glucoside and citrus pectin which are not in a native state as present in dried citrus byproduct from citrus juice extraction equipment.

22. The process in accordance with claim 12, further including calculating a feed conversion value for the poultry feed diet expended, said feed conversion value being less than that for a feed comprising said balanced feed composition and a feed supplement comprised of hesperidin, limonin glucoside and citrus pectin which are not in a native state as present in dried citrus byproduct from citrus juice extraction equipment.

23. The process in accordance with claim 12, further including calculating a feed conversion value for the poultry feed diet expended, said feed conversion value being less than that for a feed comprising said balanced feed composition in the absence of said citrus feed supplement.

24. The process according to claim 20, further including detecting average ammonia levels in the confined space at the completion of said continuing procedure, said average ammonia level being less than that of the same process which omits use of the citrus feed supplement.

25. The process according to claim 20, further including determining an HDL level of said poultry after said continuing procedure, said HDL level being greater than that of the same process which omits use of the citrus feed supplement.

26. The process according to claim 12, further including providing the citrus feed supplement into the poultry feeding area in the absence of an extraction being practiced upon the citrus byproduct peel and pulp component.

27. The process according to claim 12, wherein the providing of said citrus feed supplement places citrus byproduct into the poultry feed diet without purifying the citrus byproduct present in the citrus feed supplement.

28. The process according to claim 12 wherein the providing of said citrus feed supplement places citrus byproduct into the poultry feed diet without extracting the citrus byproduct present in the citrus feed supplement.

* * * * *